(12) United States Patent
Forrest et al.

(10) Patent No.: US 6,293,116 B1
(45) Date of Patent: Sep. 25, 2001

(54) HUMIDITY CONTROL METHOD FOR A VARIABLE CAPACITY VEHICLE CLIMATE CONTROL SYSTEM

(75) Inventors: Wayne Oliver Forrest, Gasport; Elliott D. Keen, Lockport; Mohinder Singh Bhatti, Amherst, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/546,295

(22) Filed: Apr. 10, 2000

(51) Int. Cl.$^7$ ..................................................... F25B 49/02
(52) U.S. Cl. .............................. 62/227; 62/229; 62/176.6; 62/176.3; 62/228.5; 236/44 C; 165/230
(58) Field of Search ................................ 62/227, 226, 229, 62/228.1, 228.4, 228.5, 176.1, 176.3, 176.5, 176.6; 236/44 R, 44 A, 44 C; 165/222, 230, 223

(56) References Cited

U.S. PATENT DOCUMENTS

| | | | |
|---|---|---|---|
| 4,540,040 | * 9/1985 | Fukumoto et al. | ................ 62/229 X |
| 4,848,444 | * 7/1989 | Heinle et al. | ................... 62/176.6 X |
| 4,878,358 | * 11/1989 | Fujii | ................................ 62/227 X |
| 5,191,768 | * 3/1993 | Fujii | ................................ 62/229 X |
| 5,884,497 | * 3/1999 | Kishita et al. | ...................... 62/227 X |

\* cited by examiner

Primary Examiner—Harry B. Tanner
(74) Attorney, Agent, or Firm—Patrick M. Griffin

(57) ABSTRACT

An improved vehicle climate control system in which the passenger compartment temperature and humidity are controlled without requiring a humidity sensor. The control is based on the recognition that the air temperature at the evaporator outlet represents the dew point of the air supplied to the passenger compartment, and may be specified based on the desired passenger compartment air temperature to achieve a desired relative humidity in the vehicle once the desired passenger compartment temperature has been achieved. In a first mechanization, the desired relative humidity is predetermined, and the corresponding values of evaporator outlet air temperature are determined as a function of the desired passenger compartment temperature. In a second mechanization, the operator of the vehicle is permitted to select a desired relative humidity, and the corresponding values of evaporator outlet air temperature are determined as a function of the desired passenger compartment temperature and the selected humidity level.

8 Claims, 3 Drawing Sheets

HUMIDITY CONTROL METHOD FOR A VARIABLE CAPACITY VEHICLE CLIMATE CONTROL SYSTEM

TECHNICAL FIELD

This invention relates to a vehicle climate control system having a variable capacity refrigerant compressor and more particularly to a system that regulates passenger compartment humidity without requiring a humidity sensor.

BACKGROUND OF THE INVENTION

A vehicle climate control system performs two primary functions: temperature regulation and dehumidification. In a system having a variable capacity refrigerant compressor, this is generally achieved by adjusting the stroke of the compressor based on the cooling load, and then reheating the cooled and dehumidified air as required to regulate the temperature of the passenger compartment air at the desired temperature. In this type of control the principal feedback variable is passenger compartment temperature, and the relative humidity within the passenger compartment varies significantly depending on cooling load, ambient humidity, and so on.

While widely used, the above-described approach exhibits significant drawbacks in terms of both compressor power consumption and passenger comfort. System efficiency suffers due to overcooling and then reheating for purposes of temperature regulation, while passenger comfort suffers under conditions where the relative humidity of the passenger compartment falls below a comfortable level. Clearly, reducing the compressor capacity under certain conditions will improve both vehicle fuel economy and passenger comfort without degrading the passenger compartment temperature control.

For the above reasons, it has been proposed to measure the relative humidity in the passenger compartment and to regulate the system operation to control both temperature and humidity. However, an accurate humidity sensor significantly increases system cost, and therefore limits the system applicability to primarily luxury vehicles. Accordingly what is needed is a cost effective approach for controlling both temperature and humidity in a vehicle climate control system.

SUMMARY OF THE INVENTION

The present invention is directed to an improved vehicle climate control system in which the passenger compartment temperature and humidity are controlled without requiring a humidity sensor. This invention is based on the recognition that the air temperature at the evaporator outlet represents the dew point of the air supplied to the passenger compartment, and may be specified based on the desired passenger compartment air temperature to achieve a desired relative humidity in the vehicle once the desired passenger compartment temperature has been achieved. According to a first embodiment, the desired relative humidity is predetermined, and the corresponding values of evaporator outlet air temperature are determined as a function of the desired passenger compartment temperature. According to a second embodiment, the operator of the vehicle is permitted to select a desired relative humidity, and the corresponding values of evaporator outlet air temperature are determined as a function of the desired passenger compartment temperature and the selected humidity level.

DESCRIPTION OF THE PREFERRED EMBODIMENT

Figure 1:
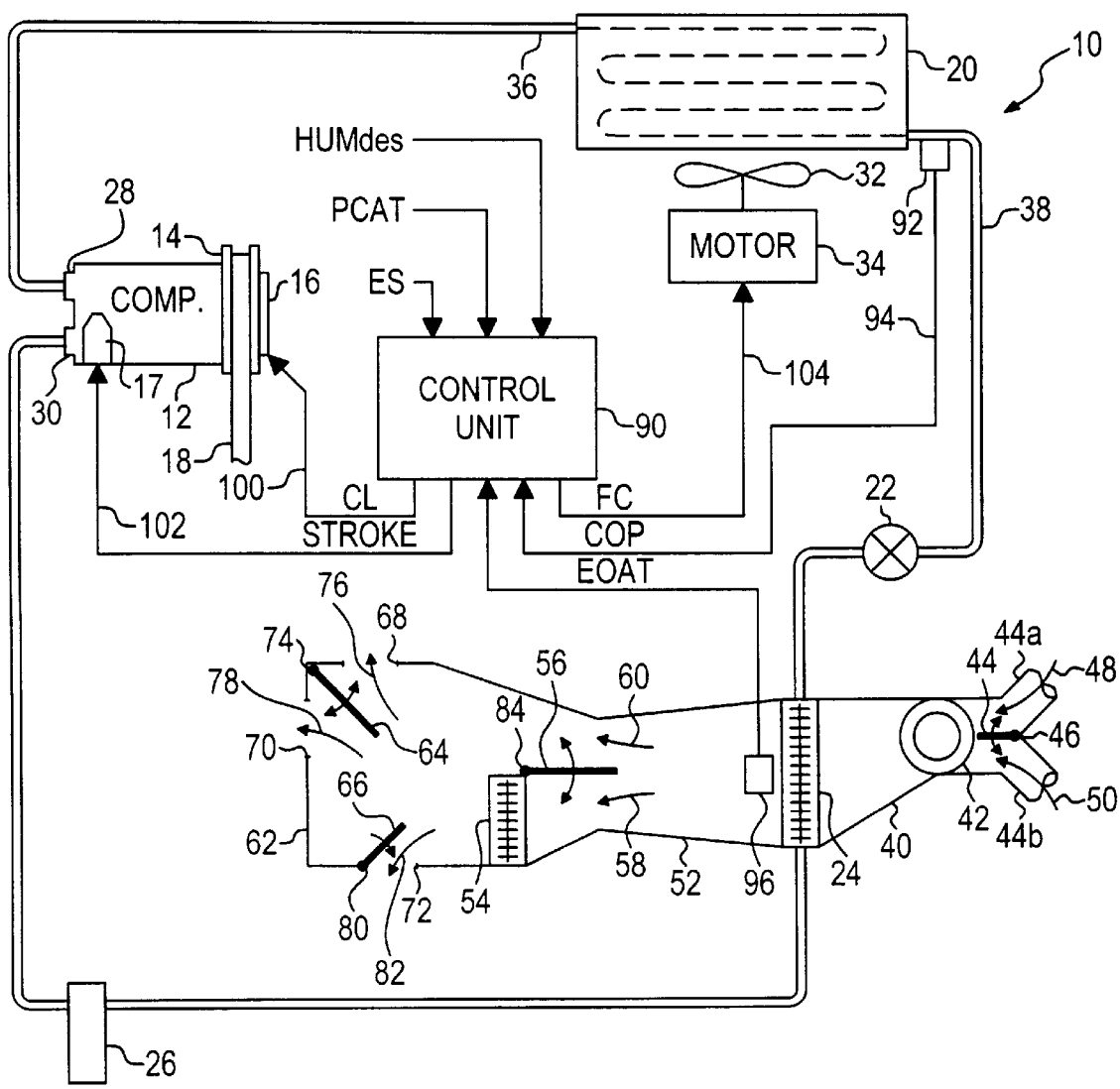
FIG. 1 is a block diagram of a vehicle climate control system according to this invention, including a microprocessor based control unit.

Referring to FIG. 1, the reference numeral 10 generally designates a vehicle climate control system, including a variable capacity refrigerant compressor 12 coupled to a drive pulley 14 via an electrically activated clutch 16. The compressor 12 may have a variable stroke for adjusting its capacity, and includes a stroke control valve 17 that is electrically activated to effect capacity control. The pulley 14 is coupled to a rotary shaft of the vehicle engine (not shown) via drive belt 18, and the clutch 16 is selectively engaged or disengaged to turn the compressor 12 on or off, respectively. The HVAC system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from the high pressure refrigerant in condenser 20. The orifice tube 22 allows the cooled high pressure refrigerant in line 38 to expand in an isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a motor driven ventilation blower 42 for forcing air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 pivoted at a point 84 next to heater core 54 is adjustable as shown to control how much of the air must pass through the heater core 54. Air passing through heater core 54 is indicated by the arrow 58, while air by-passing the heater core 54 is indicated by the arrow 60. The heated and un-heated air portions are mixed in a plenum portion 62 of outlet duct 52 downstream of re-heat door 56, and a pair of mode control doors 64, 66 direct the mixed air through one or more outlets, including a defrost outlet 68, a panel outlet 70, and a heater outlet 72. The mode control door 64 is pivoted at point 74, and is adjustable as shown to switch the outlet air between the defrost and panel outlets 68, 70, as indicated by arrows 76, 78, respectively. The mode control door 66 is pivoted at point 80, and is adjustable as shown to control airflow through the heater outlet 72, as indicted by arrow 82.

The above-described system 10 is controlled by the microprocessor-based control unit 90 based on various inputs, including engine speed ES, passenger compartment air temperature PCAT, condenser outlet pressure COP, and evaporator outlet air temperature EOAT. The condenser outlet pressure COP is detected by a pressure sensor 92 that is coupled to line 38 at the outlet of condenser 20 and that produces an electrical representation of the sensed pressure on line 94. The evaporator outlet air temperature EOAT is detected by a temperature sensor 96 that is disposed on the downstream side of evaporator 24 and that produces an electrical representation of the sensed temperature on line 98. Other inputs not shown in FIG. 1 include the usual operator demand inputs, such as the desired temperature (SET TEMP), and override controls for fan and mode. A final input according to one embodiment of this invention reflects a desired relative humidity HUMdes selected by the vehicle operator. In response to the above-mentioned inputs, the control unit 90 develops output signals for controlling the compressor clutch 16, the capacity control valve 17, the fan motor 34, the blower 42, and the air control doors 44, 56, 64 and 66. In FIG. 1, the output signal CL for the clutch 16 appears on line 100, the output signal STROKE for the compressor appears on line 102, and the output signal FC for the fan control appears on line 104. For simplicity, output signals and actuators for the air control doors 44, 56, 64, 66 have been omitted.

When controlled in a conventional manner, the climate control system 10 is usually able to produce a passenger compartment temperature that satisfies the desired temperature SET TEMP. The relative humidity, on the other hand, is indirectly controlled by the capacity of the compressor 12. In general, increasing the capacity of compressor 12 lowers the temperature of the evaporator 24, which causes more water vapor to condense on the surface of evaporator 24 as the air passes through it. Sufficient dehumidification is ordinarily achieved by controlling the capacity to a relatively high level, and then re-heating the chilled air by diverting it through heater core 54 in order to regulate the outlet temperature of the air. With such an approach, however, the humidity level in the passenger compartment is often lower than it needs to be. As a result, the passengers experience some discomfort, and the energy required to operate the compressor 12 exceeds the physical requirement.

Figure 2:
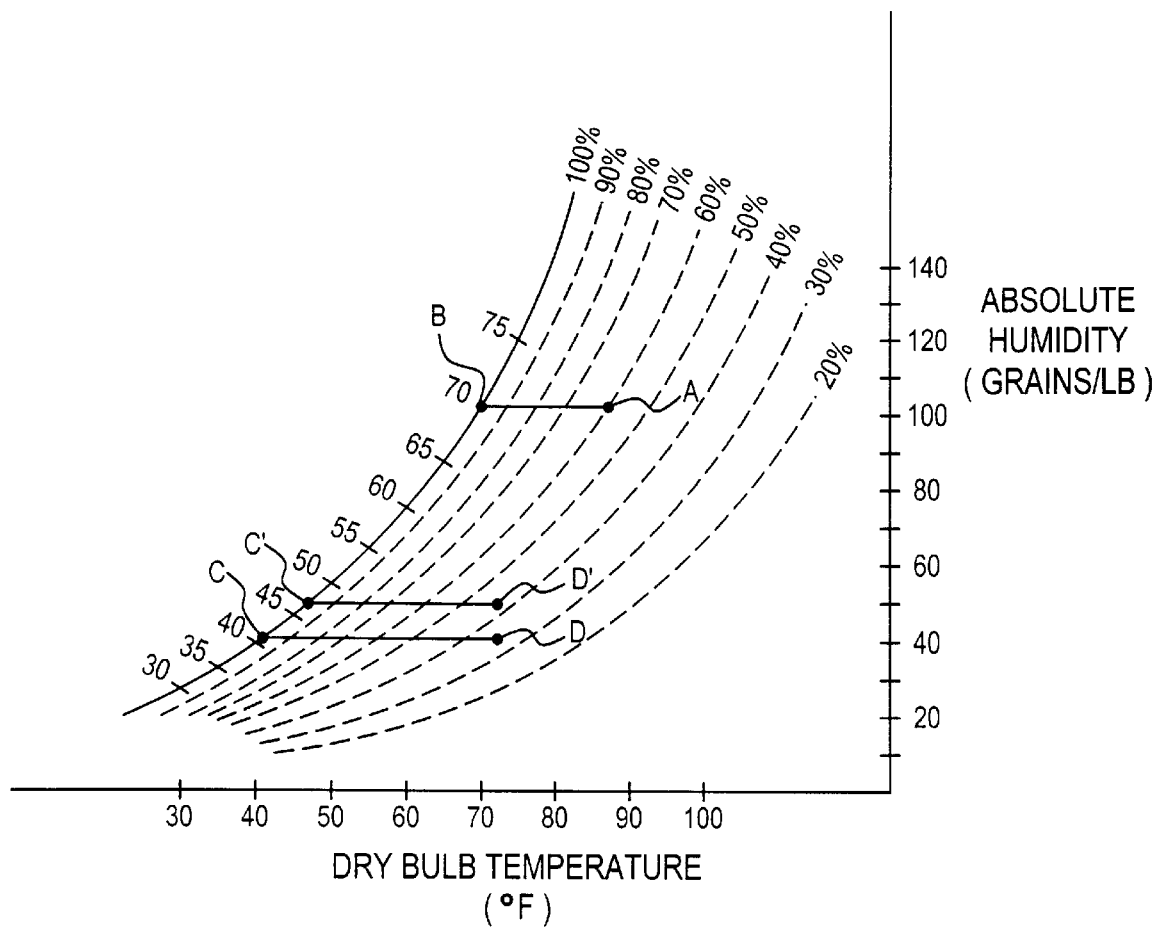
FIG. 2 is a psychrometric chart illustrating different possible operating modes of the climate control system of FIG. 1.

FIG. 2 is a psychrometric chart depicting absolute humidity of air as a function of dry bulb temperature, with the broken lines representing lines of constant relative humidity. The various data points A, B, C, C', D and D' represent the condition of air outside the vehicle, at various points in the ducts 40, 52, and in the passenger compartment. For example, outside air having a dry bulb temperature of 86° F. and a relative humidity of approximately 60% is represented by the point A. As the air passes through the evaporator 24, its dry bulb temperature decreases with no change in absolute humidity until the relative humidity rises to 100%, as depicted by the line segment A–B. As the air is further cooled, water vapor condenses on the surface of evaporator 24, with the relative humidity remaining at 100%. Under a given set of conditions, the wet bulb temperature of the evaporator 24 with a conventional control approach, is approximately 41° F., so that air at the evaporator outlet is represented by the point C. Then, the air is re-heated by the heater core 54 so that the air temperature in the passenger compartment has a dry bulb temperature of 72° F. As the air is re-heated, its absolute humidity remains the same, but its relative humidity drops, as indicated by the line segment C–D. In the illustrated example, the air in the passenger compartment has a relative humidity of approximately 35%. Thus, the conventional control achieves the desired passenger compartment temperature, but at a relative humidity that is too low for passenger comfort.

Both system efficiency and passenger comfort can be improved in the above-described example by operating the compressor 12 at a lower capacity. Operating the compressor 12 at a lower capacity increases the dew point temperature of the evaporator 24 (to 47° F. for example), so that the air at the evaporator outlet is represented by the point C'. In this case, a smaller amount of re-heat is required to raise the air temperature to 72° F., as indicated by the line segment C'–D'; additionally, the relative humidity of the outlet air increases to a more comfortable level of approximately 43%.

In view of the above, it is obvious that efficiency and comfort improvements could be achieved by measuring the passenger compartment humidity, and controlling the compressor capacity accordingly. However, the expense of an accurate humidity sensor and its installation is quite high, severely restricting widespread usage of such a system.

The present invention, on the other hand, achieves humidity control without requiring a humidity sensor. Specifically, the present invention recognizes that the temperature of the air at the evaporator outlet (that is, EOAT) is an accurate representation of the dew point of the air delivered to the passenger compartment. For example, the 72° F. air represented by the point D' in FIG. 2 has a dew point of 47° F., which can be directly measured by the EOAT sensor 96 of FIG. 1. According to this invention, the passenger compartment humidity can be controlled by specifying a desired evaporator outlet air temperature EOATdes (dew point) as a function of the desired passenger compartment temperature and the desired relative humidity, and controlling the compressor capacity to achieve EOATdes once the desired passenger compartment temperature has been achieved.

According to a first embodiment of this invention, the desired relative humidity is predetermined (either constant or variable with passenger compartment temperature), and the corresponding values of EOATdes are stored in a look-up table as a function of SET TEMP. For example, referring to FIG. 2, the EOATdes table value would be 47° F. for a desired relative humidity level of 43% and a desired passenger compartment temperature of 72° F.

According to a second embodiment of this invention, the operator of the vehicle is permitted to select a desired relative humidity (HUMdes), and the corresponding values of EOATdes are determined as a function of SET TEMP and HUMdes. In this case, it may be more desirable to determine EOATdes by calculation instead of table look-up. For example, the desired relative humidity HUMdes and the desired passenger compartment temperature may be used to determine the absolute humidity, which in turn may be used to compute the dew point temperature, or EOATdes. Suitable formulas for carrying out these computations are set forth, for example, in SAE Paper No. 980289 by M. S. Bhatti, entitled "Open Air Cycle Air Conditioning System For Motor Vehicles", published Feb. 26, 1998.

Figure 3:
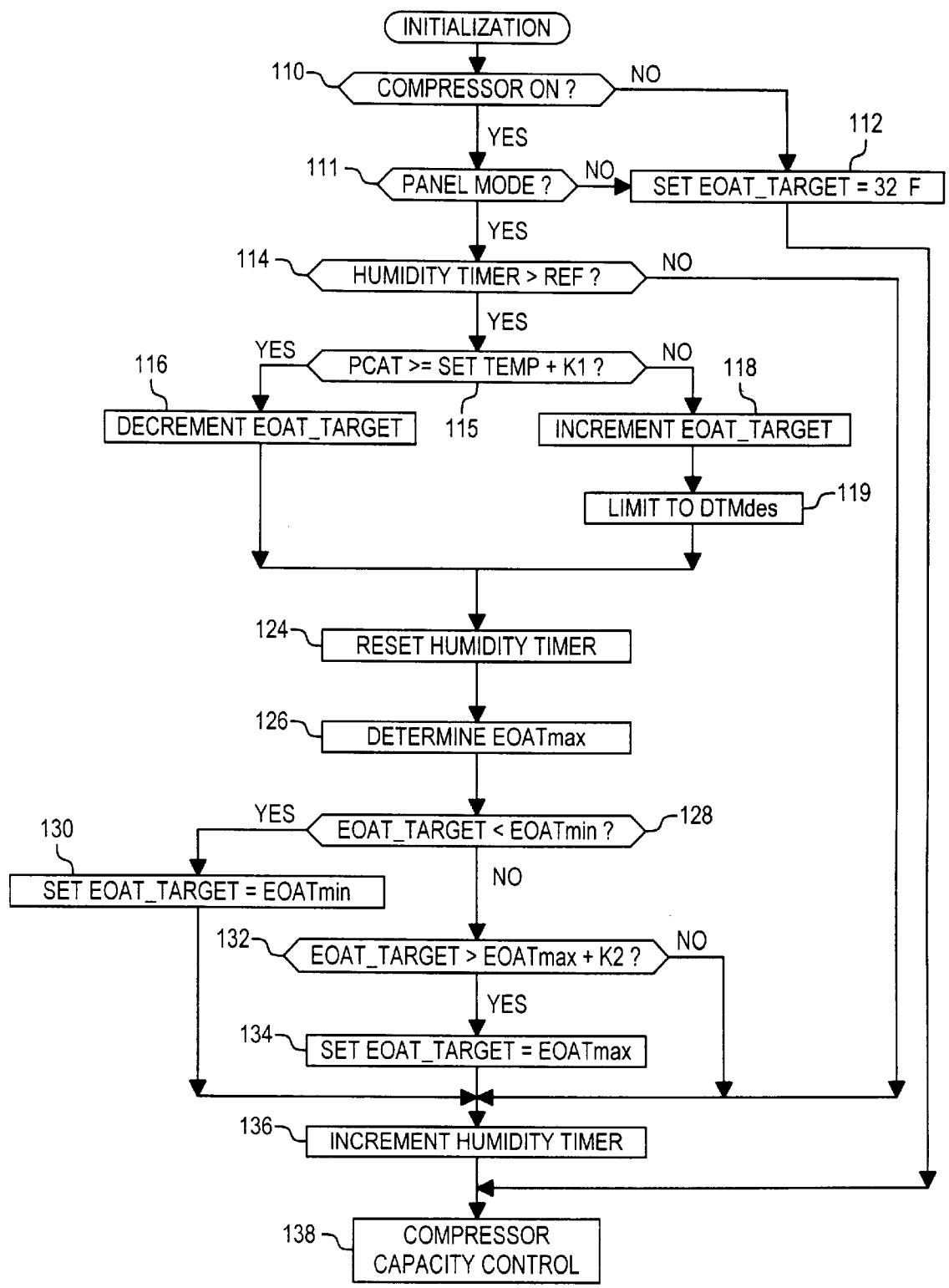
FIG. 3 is a flowchart representing computer program instructions executed by the microprocessor based control unit of FIG. 1 in carrying out the control of this invention.

FIG. 3 depicts a flow diagram representative of computer program instructions executed by the control unit 90 for carrying out the above-described control method in the context of a compressor capacity control (designated by block 138 in FIG. 3) which activates stroke control valve 17 as required to achieve a target evaporator outlet air temperature, referred to herein as EOAT_TARGET. In other words, the activation of stroke control valve 17 is adjusted based on the measured deviation of EOAT from EOAT_TARGET, so as to increase the compressor capacity if EOAT is higher than EOAT_TARGET, and decrease the compressor capacity if EOAT is lower than EOAT_TARGET. Additionally, the control unit 90 adjusts the position of re-heat door 56 as required to achieve a desired outlet air temperature, as discussed above.

Turning to FIG. 3, the block 110 determines whether the compressor 12 is on (that is, whether clutch 16 is engaged), and if so, the block 111 determines whether the system 10 is operating in a panel-discharge mode (as opposed to a defrost mode, for example). If the compressor 12 is off or the system 10 is not operating in a panel discharge mode, the blocks 112 and 138 are executed to set EOAT_TARGET equal to a minimum value such as 32° F. and to control the compressor capacity accordingly. This serves to initialize the compressor 12 at maximum capacity to quickly cool the passenger compartment when air conditioning operation is activated. When blocks 110 and 111 are answered in the affirmative, the block 114 is executed to determine if the count of a HUMIDITY TIMER has reached a reference count REF. If not, the block 136 increments the HUMIDITY TIMER and the routine is exited; if so, updating of EOAT_TARGET is allowed, and block 115 compares the passenger compartment air temperature PCAT to the sum (SET TEMP+K1), where K1 is a calibrated constant. If PCAT is greater than or equal to the sum, the block 116 decrements EOAT_TARGET by a fixed amount, which causes the control unit 90 to increase the compressor capacity, as explained above. If PCAT is less than the sum, the blocks 118 and 119 are executed to increment EOAT_TARGET by a fixed amount, which causes the control unit 90 to decrease the compressor capacity, and to limit EOAT_TARGET to an upper duct temperature value DTMdes so that the outlet air temperature does not exceed a desired level. The block 124 then resets the HUMIDITY TIMER to zero and the block 126 is executed to determine a value of EOATmax based on SET TEMP (according to the first embodiment), or a combination of SET TEMP and HUMdes (according to the second embodiment). The block 128 then determines if EOAT_TARGET is less than a predefined minimum temperature EOATmin, and if so, block 130 limits EOAT_TARGET to EOATmin. This condition occurs during an initial cool down interval, and inhibits adjustment of EOAT_TARGET due to freeze protection considerations during such interval. If block 128 is answered in the negative, block 132 compares EOAT_TARGET to the value of EOATmax determined at block 126. If EOAT_TARGET is greater than the sum (EOATmax+K2) where K2 is a calibrated constant, controlling EOAT to EOAT_TARGET would cause the humidity level in the vehicle to be higher than the desired relative humidity, and in such case, the block 134 sets EOAT_TARGET to EOATmax. And in any event, the blocks 136 and 138 are then executed to increment HUMIDITY TIMER, and to control the compressor capacity as described above.

Thus, the control unit 90 adjusts EOAT_TARGET downward as required to bring PCAT down to SET TEMP, and once PCAT reaches SET TEMP, EOAT_TARGET is adjusted upward until it reaches EOATmax or DTMdes. In other words, the compressor capacity is reduced to achieve the desired passenger compartment humidity level once the desired passenger compartment temperature has been reached. The HUMIDITY TIMER is used to limit the adjustment rate of EOAT_TARGET based on humidity considerations; consequently, the reference REF of block 122 is selected in consideration of the execution rate of the adjustment routine and the response characteristics of the system 10.

In summary, the above-described control method achieves both improved passenger comfort and decreased compressor power consumption without requiring the expense of a passenger compartment humidity sensor. While described in reference to the illustrated embodiment, it is expected that various modifications in addition to those mentioned above will occur to those skilled in the art. For example, the evaporator fin temperature or the evaporator outlet refrigerant pressure (if available) could be used as a dew point indication in lieu of EOAT. Thus, it will be understood that methods incorporating these and other modifications may fall within the scope of this invention, which is defined by the appended claims.

What is claimed is:

1. A method of operation for a vehicle climate control system including a controlled capacity refrigerant compressor and an evaporator which receives chilled refrigerant for cooling and de-humidifying air passing through the evaporator prior to being discharged into a passenger compartment of the vehicle, comprising the steps of:

measuring an evaporator outlet parameter indicative of a dew point temperature of the air discharged into the passenger compartment;

determining a desired dew point temperature of the air based on a desired air temperature of the passenger compartment and a desired relative humidity of the passenger compartment;

determining a target value of the evaporator outlet parameter based on the desired dew point temperature; and controlling the compressor capacity to bring the measured evaporator outlet parameter into agreement with the target evaporator outlet parameter.

2. The method of claim 1, wherein the desired relative humidity of the passenger compartment is predetermined as a function of the desired air temperature of the passenger compartment.

3. The method of claim 2, wherein the desired dew point temperature of the air is determined by table look up based on the desired air temperature of the passenger compartment.

4. The method of claim 1, wherein the desired relative humidity of the passenger compartment is selected by an operator of the vehicle, and the desired dew point temperature is computed based on the desired air temperature and the desired relative humidity selected by the operator.

5. The method of claim 1, wherein the step of determining a target value of the evaporator outlet parameter includes the steps of:

measuring an actual air temperature in the passenger compartment; and setting the target value to an initial value, and subsequently adjusting the target value from said initial value based on (1) a comparison of the desired air temperature with the measured actual air temperature, and (2) a comparison of the adjusted target value with the determined target value.

6. The method of claim 5, wherein the target value is (1) adjusted based on the comparison of the desired air temperature with the measured actual air temperature, and (2) set equal to the determined target value when the adjusted target value exceeds the determined target value by a predetermined amount.

7. The method of claim 5, including the steps of:

timing a predetermined interval after adjusting the target value; and inhibiting further adjusting of the target value until expiration of the predetermined interval.

8. The method of claim 1, wherein the evaporator outlet parameter is a temperature of the air at an outlet of the evaporator.

* * * * *